United States Patent
Chang et al.

(10) Patent No.: US 10,487,675 B2
(45) Date of Patent: Nov. 26, 2019

(54) STRESS MITIGATION FEATURE FOR COMPOSITE AIRFOIL LEADING EDGE

(71) Applicant: United Technologies Corporation, Hartford, CT (US)

(72) Inventors: Hoyt Y. Chang, Manchester, CT (US); Shelton O. Duelm, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 544 days.

(21) Appl. No.: 14/765,008

(22) PCT Filed: Jan. 29, 2014

(86) PCT No.: PCT/US2014/013483
§ 371 (c)(1),
(2) Date: Jul. 31, 2015

(87) PCT Pub. No.: WO2014/126708
PCT Pub. Date: Aug. 21, 2014

(65) Prior Publication Data
US 2015/0377045 A1    Dec. 31, 2015

Related U.S. Application Data

(60) Provisional application No. 61/765,860, filed on Feb. 18, 2013.

(51) Int. Cl.
*F04D 29/24* (2006.01)
*F03B 3/16* (2006.01)
(Continued)

(52) U.S. Cl.
CPC .............. *F01D 9/02* (2013.01); *F01D 5/147* (2013.01); *F01D 5/282* (2013.01); *F01D 5/284* (2013.01);
(Continued)

(58) Field of Classification Search
CPC ........... F01D 5/147; F01D 5/282; F01D 5/284
USPC .......... 415/200; 416/241 B, 232, 229 A, 230
See application file for complete search history.

(56) References Cited

U.S. PATENT DOCUMENTS 3,726,604 A * 4/1973 Helms ................... F01D 5/184
                                                                    415/115
5,042,968 A * 8/1991 Fecto ..................... B29C 44/16
                                                                    264/46.6
(Continued)

FOREIGN PATENT DOCUMENTS

EP        0969116 A1    1/2000
EP        1930548 A2    6/2008

OTHER PUBLICATIONS

International Preliminary Report on Patentability for International Application No. PCT/US2014/013483 dated Aug. 27, 2015.
(Continued)

*Primary Examiner* — Deming Wan
(74) *Attorney, Agent, or Firm* — Carlson, Gaskey & Olds, P.C.

(57) ABSTRACT

A vane assembly within a mid-turbine frame of a gas turbine engine includes an airfoil that extends between an outer platform and an inner platform. The airfoil includes an outer wall defining a leading edge of a first radius. An inner wall of the airfoil defines an inner cavity including a forward portion proximate the leading edge defining a second radius different than the first radius.

12 Claims, 3 Drawing Sheets

(51) Int. Cl.
*F03D 1/04* (2006.01)
*F01D 5/18* (2006.01)
*B63H 1/26* (2006.01)
*B64C 11/24* (2006.01)
*B64C 27/473* (2006.01)
*F01D 5/14* (2006.01)
*F01D 5/28* (2006.01)
*F01D 9/02* (2006.01)
*F01D 9/04* (2006.01)
*F01D 25/16* (2006.01)

(52) U.S. Cl.
CPC ............ *F01D 9/041* (2013.01); *F01D 5/18* (2013.01); *F01D 25/162* (2013.01); *F05D 2220/32* (2013.01); *F05D 2230/23* (2013.01); *F05D 2230/60* (2013.01); *F05D 2240/12* (2013.01); *F05D 2240/121* (2013.01); *F05D 2240/303* (2013.01); *F05D 2300/2261* (2013.01); *F05D 2300/44* (2013.01); *F05D 2300/6012* (2013.01); *F05D 2300/6033* (2013.01); *Y02T 50/672* (2013.01); *Y02T 50/673* (2013.01)

(56) References Cited

U.S. PATENT DOCUMENTS

| | | | |
|---|---|---|---|
| 5,127,802 A * | 7/1992 | Carlson | B29C 44/18 29/889.71 |
| 5,484,258 A | 1/1996 | Isburgh et al. | |
| 6,183,192 B1 | 2/2001 | Tressler et al. | |
| 6,284,390 B1 * | 9/2001 | Bose | C23C 28/3215 416/241 B |
| 6,709,230 B2 | 3/2004 | Morrison et al. | |
| 7,066,717 B2 | 6/2006 | Morrison et al. | |
| 7,435,058 B2 | 10/2008 | Campbell et al. | |
| 7,452,189 B2 | 11/2008 | Shi et al. | |
| 7,600,979 B2 | 10/2009 | Steibel et al. | |
| 7,887,300 B2 | 2/2011 | Mazzola et al. | |
| 8,137,611 B2 | 3/2012 | Merrill et al. | |
| 8,167,573 B2 | 5/2012 | Merrill et al. | |
| 2001/0012568 A1 | 8/2001 | Bose et al. | |
| 2005/0076504 A1 * | 4/2005 | A. Morrison | F01D 5/282 29/889.72 |
| 2005/0238491 A1 | 10/2005 | Morrison et al. | |
| 2008/0025846 A1 | 1/2008 | Vance et al. | |
| 2009/0035138 A1 | 2/2009 | Harrison et al. | |
| 2013/0171426 A1 * | 7/2013 | de Diego | C04B 35/117 428/182 |
| 2014/0079542 A1 * | 3/2014 | Bullied | B22C 7/02 415/208.1 |

OTHER PUBLICATIONS

International Search Report and Written Opinion for International Application No. PCT/US2014/013483 dated May 9, 2014.
European Search Report for EP Application No. 14751134.9 dated Sep. 27, 2016.

* cited by examiner

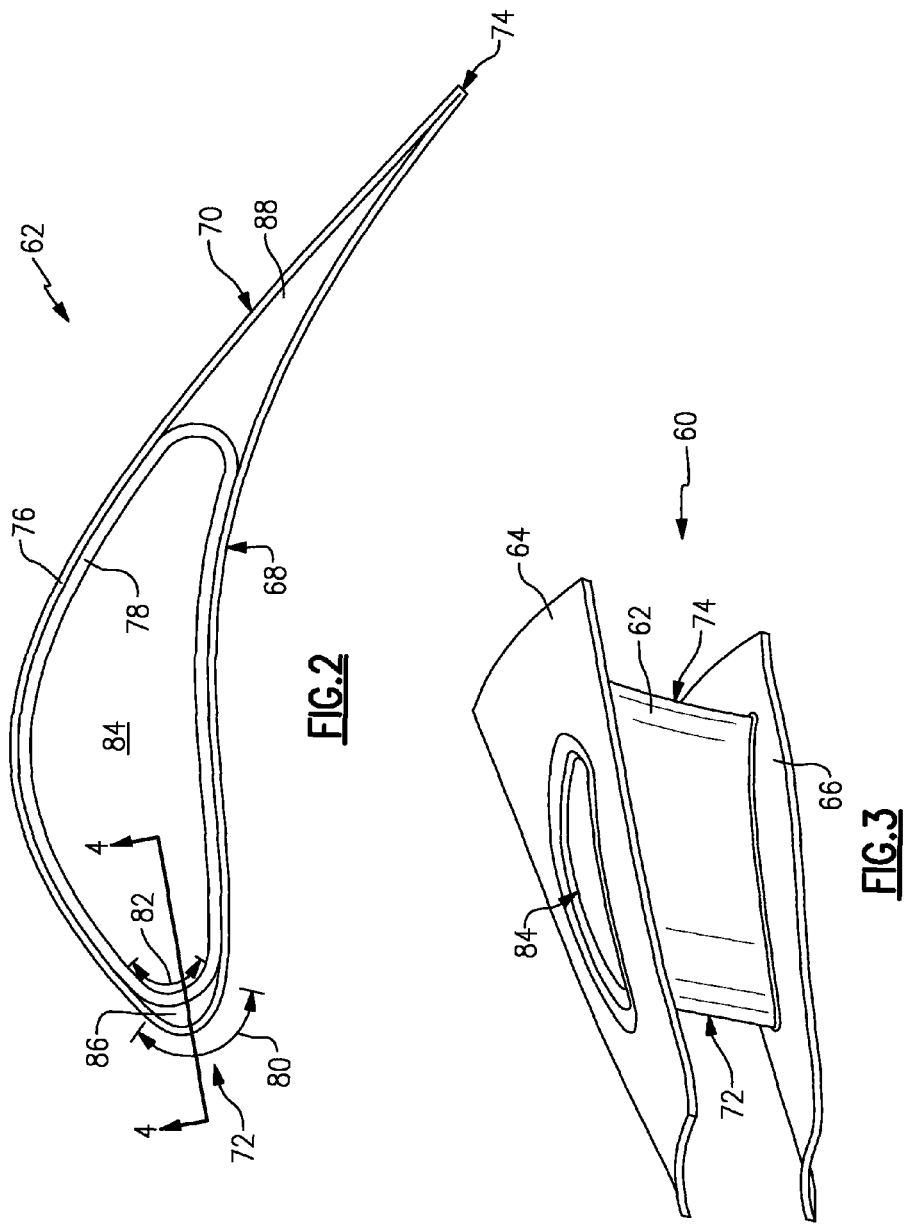

STRESS MITIGATION FEATURE FOR COMPOSITE AIRFOIL LEADING EDGE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils are utilized throughout the gas turbine engine and uniquely configured to provide specific functions. Some airfoils include a hollow interior chamber. Pressure within the interior chamber is typically higher than pressures outside of the airfoils. The pressure differential between the interior and exterior of the airfoil creates an imbalance that tries to bulge the airfoil outward. The airfoil leading edge is typically provided with a small radius and can result in the generation of large stresses at the leading edge.

Large stresses at the airfoil leading edge can prevent the use of some materials such as ceramic composite materials that have favorable thermal performance properties. Accordingly, it is desirable to design and develop airfoil features that reduce stresses and provide for the use of material with favorable performance properties.

SUMMARY

An airfoil assembly according to an exemplary embodiment of this disclosure, among other possible things includes an outer wall defines a leading edge of a first radius; and an inner wall defines a second radius adjacent the leading edge that is larger than the first radius.

In a further embodiment of the foregoing airfoil assembly, the inner wall defines a cavity within the outer wall.

In a further embodiment of any of the foregoing airfoil assemblies, includes a first spacing between the outer wall and the inner wall proximate the leading edge. The first spacing is filled with material.

In a further embodiment of any of the foregoing airfoil assemblies, the material includes stacked layers of material.

In a further embodiment of any of the foregoing airfoil assemblies, the outer wall and the inner wall include a ceramic matrix composite.

In a further embodiment of any of the foregoing airfoil assemblies, the outer wall defines a trailing edge and a second spacing is disposed between the outer wall and the inner wall at the trailing edge and the second spacing is filled with staked plies of material.

In a further embodiment of any of the foregoing airfoil assemblies, the second spacing is filled with material.

In a further embodiment of any of the foregoing airfoil assemblies, the airfoil includes a mid-turbine frame vane.

A vane assembly according to an exemplary embodiment of this disclosure, among other possible things includes an outer platform, an inner platform, and an airfoil extends between the outer platform and the inner platform. The airfoil includes an outer wall defining a leading edge of a first radius. An inner wall defines an inner cavity through the airfoil. The inner wall includes a forward portion proximate the leading edge defining a second radius different than the first radius.

In a further embodiment of the foregoing vane assembly, includes a first spacing between the outer wall and the inner wall at the leading edge. A material is disposed within the first spacing.

In a further embodiment of any of the foregoing vane assemblies, the material includes stacked plies.

In a further embodiment of any of the foregoing vane assemblies, the airfoil includes a ceramic matrix composite.

In a further embodiment of any of the foregoing vane assemblies, the outer platform and the inner platform include a ceramic matrix composite integrally formed with the airfoil.

In a further embodiment of any of the foregoing vane assemblies, the first radius is smaller than the second radius.

In a further embodiment of any of the foregoing vane assemblies, the outer wall defines a trailing edge and a second spacing is disposed between the outer wall and the inner wall at the trailing edge and the second spacing is filled with staked plies of material.

A method of forming an airfoil according to an exemplary embodiment of this disclosure, among other possible things includes forming an outer wall with layers material to define a leading edge with a first radius, forming an inner wall to include a second radius different than the first radius proximate the leading edge formed in the outer wall, and filling a space between the inner wall and the outer wall at the leading edge with material.

In a further embodiment of the foregoing method, the material disposed within the space between the inner wall and the outer wall includes stacked layers of material.

In a further embodiment of any of the foregoing methods, includes forming the outer wall and the inner wall with plies of a ceramic matrix composite bonded to one another by a resin.

In a further embodiment of any of the foregoing methods, the ceramic matrix composite is a silicon carbide material.

In a further embodiment of any of the foregoing methods, the first radius is smaller than the second radius.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a cross-section view of an airfoil portion.

FIG. 3 is a perspective view of an example mid turbine frame assembly.

DETAILED DESCRIPTION

Figure 1:
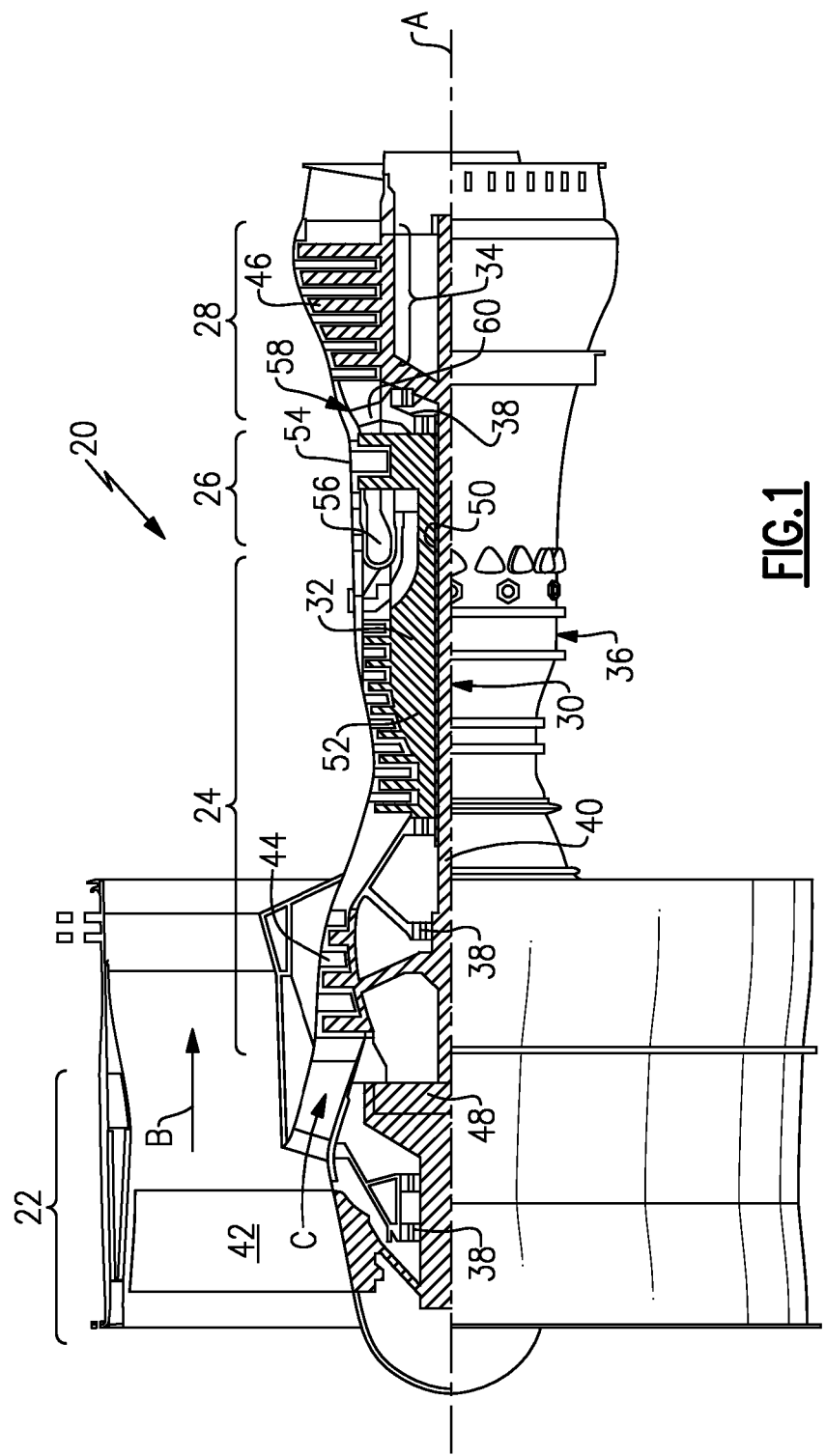
FIG. 1 is a schematic view of an example gas turbine engine.

FIG. 1 schematically illustrates an example gas turbine engine 20 that includes a fan section 22, a compressor section 24, a combustor section 26 and a turbine section 28.

Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes airfoils assemblies 60, which are in the core airflow path and function as an inlet guide vane for the low pressure turbine 46. Utilizing the airfoils assemblies 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIGS. 2 and 3, the mid turbine frame 58 includes an airfoil assembly indicated at 60. The example airfoil assembly 60 includes an airfoil 62 disposed between an outer platform 64 and an inner platform 66. A cavity 84 extends through the airfoil 62 and the outer platform 64 and inner platform 66. The example airfoil 62 is formed from a ceramic matrix composite (CMC) material. The CMC material typically comprises layers or plies that are wrapped around a form to define the desired airfoil configuration. The adjoining layers are adhered to each other using a resin. The CMC material includes known materials including for example, a silicon carbide material.

The airfoil 62 includes a suction side 70 and a pressure side 68 that extend between a leading edge 72 and a trailing edge 74. The example airfoil 62 includes an outer wall 76 that defines the aerodynamic shape of the airfoil 62. An inner wall 78 defines the boundaries of the cavity 84. Both the outer wall 76 and the inner wall 78 are formed from a CMC material.

The airfoil 62 leading edge 72 includes a first radius 80 that is substantially small to provide desired aerodynamic profile favorable to the airflow requirements through the mid turbine frame assembly 58.

Pressure outside of the airfoil 62 is typically less than pressure within the cavity 84 of the airfoil 62. The resulting pressure differential causes a force in a direction outward from the cavity 84 that acts to generate a bulge in the airfoil 62. As appreciated, the airfoil 62 does not actually bulge due to the configuration of the inner wall 78 and the outer wall 76. However, stress generated by the pressure differential is encountered within the inner and outer walls 78, 76. Moreover, such stresses are concentrated at tighter radius regions such as the radius 80 provided at the leading edge 72.

The example cavity 84 is formed with an inner wall 78 that defines a second radius 82 proximate the leading edge 72. The second radius 82 disposed at an inner part of the leading edge 72 is defined by the inner wall 78 and is larger than the first radius 80 defined by the outer wall 76. The larger radius 82 defined by the inner wall 78 is better suited to accommodate stresses generated by the pressure differential between the cavity 84 and the outer surface of the airfoil 62.

The differences in the first radius 80 and the second radius 82 result in the creation of a space 86 between the outer wall 76 and the inner wall 78 at the leading edge 72. Moreover, a second space 88 is defined near the trailing edge 74 between the inner wall 78 and the outer wall 76. Each of the first space 86 and the second space 88 are filled with a material, for example a ceramic matrix composite material, to provide the desired support for the inner wall 78 such that it may be supported against the pressure differentials across the airfoil 62.

Figure 4:
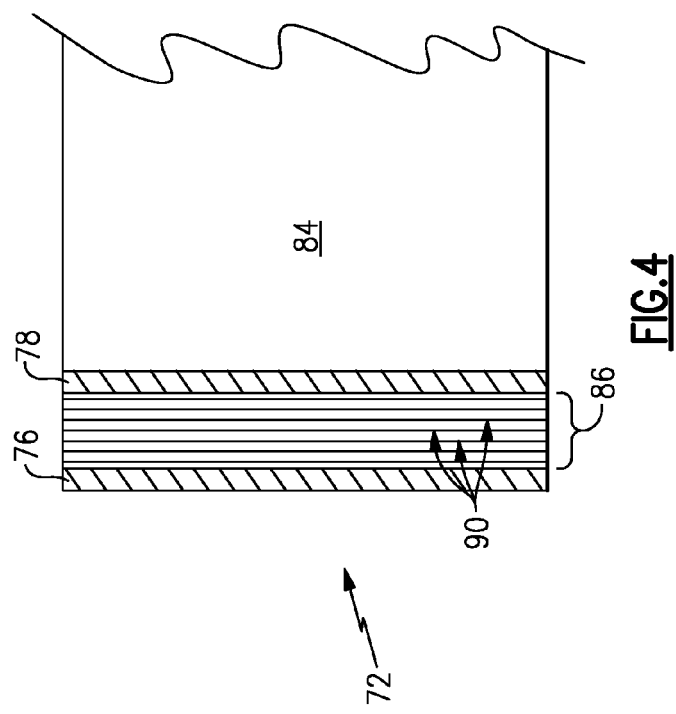
FIG. 4 is a cross-section through a leading edge of the example airfoil.

Referring to FIG. 4, with continued reference to FIGS. 2 and 3, a cross-section through the leading edge 72 illustrates that the inner wall 78 is spaced apart from the outer wall 76 to create a spacing 86. In this example, the space 86 is filled with a material comprising a plurality of layers 90. The plurality of layers or plies are formed of CMC material stacked within the space 86 between the inner wall 78 and the outer wall 76. This material provides a backing to the outer wall 76 and the inner wall 78 to reinforce the outer wall 76 and leading edge 72.

Figure 5:
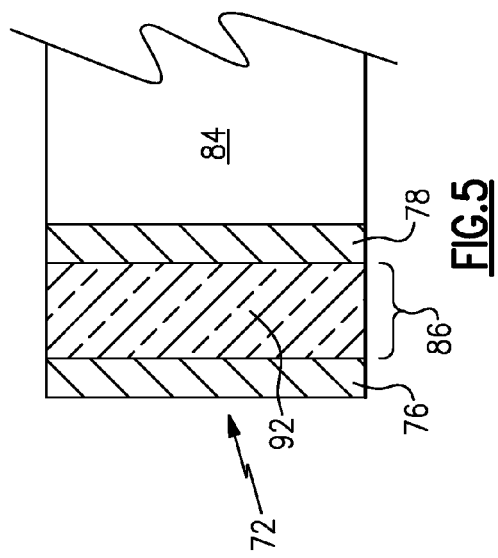
FIG. 5 is another cross-section through the leading edge of the example airfoil.

Referring to FIG. 5, in another example airfoil 62, the leading edge 72 includes the spacing 86 that is filled with a solid material 92. In this example, the solid material can be of CMC material or other resin material that cures to fill the entire space 86 between the inner wall 78 and the outer wall 76.

Figure 6:
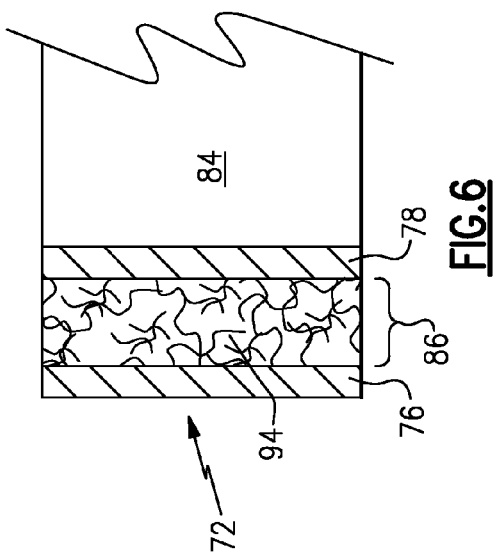
FIG. 6 is another cross-section through the leading edge of the example airfoil.

Referring to FIG. 6, the spacing 86 that is filled with a combination of resin material and chopped fibers 94 to fill the space 86 between the inner wall 78 and the outer wall 76. As appreciated, any material can be utilized to fill the space between the inner wall 78 and the outer wall 76 within the first spacing 86 at the leading edge and the second spacing 88 at the trailing edge 74.

In the disclosed examples, the materials that are utilized are CMC materials including plies or resins that are compatible with the material forming the walls 76, 78. The use of such materials as filler within the spacings 86, 88 are desirable as they include similar thermal properties as ceramic matrix composite materials that are used to fabricate the inner wall 78 and the outer wall 76.

Accordingly, the example airfoil provides for the fabrication and use of CMC materials while also providing the desired stress reductions at critical portions, including the leading edge of the airfoil 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of forming an airfoil comprising;
   forming an outer wall to define a leading edge with a first radius;
   forming an inner wall to include a second radius different than the first radius proximate the leading edge formed in the outer wall and an open cavity within the outer wall, wherein each of the outer wall and the inner wall are formed with plies of a ceramic matrix composite bonded to one another by a resin; and
   filling an empty space between the inner wall and the outer wall at the leading edge with stacked layers of material, wherein the stacked layers of material filling the empty space is not part of the inner wall or the outer wall.

2. The method as recited in claim 1, wherein the ceramic matrix composite is a silicon carbide material.

3. The method as recited in claim 1, wherein the first radius is smaller than the second radius.

4. An airfoil assembly comprising:
   an outer wall defining a leading edge of a first radius; and
   an inner wall defining a second radius adjacent the leading edge that is larger than the first radius, the inner wall defines an open cavity within the outer wall wherein each of the outer wall and the inner wall are formed with plies of a ceramic matrix composite bonded to one another by a resin;
   a first spacing between the outer wall and the inner wall proximate the leading edge, the first spacing being an empty space and wherein the first spacing is filled with stacked layers of material and the stacked layers of material filling the first spacing does not form any portion of the outer wall and the inner wall and wherein the outer wall comprises the ceramic matrix composite.

5. The airfoil assembly as recited in claim 4, wherein the airfoil comprises a mid-turbine frame vane.

6. The vane assembly as recited in claim 4, wherein both the inner wall and the outer wall comprise the ceramic matrix composite.

7. An airfoil assembly comprising:
   an outer wall defining a leading edge of a first radius; and
   an inner wall defining a second radius adjacent the leading edge that is larger than the first radius, the inner wall defines an open cavity within the outer wall wherein each of the outer wall and the inner wall are formed with plies of a ceramic matrix composite bonded to one another by a resin;

a first spacing between the outer wall and the inner wall proximate the leading edge, the first spacing being an empty space and wherein the first spacing is filled with stacked layers of material and the stacked layers of material filling the first spacing does not form any portion of the d the inner wall and wherein the outer wall comprises the ceramic matrix compos, wherein the outer wall defines a trailing edge and a second spacing is disposed between the outer wall and the inner wall at the trailing edge and the second spacing is filled with a stacked plies of material.

8. A vane assembly comprising:
an outer platform;
an inner platform;
an airfoil extending between the outer platform and the inner platform, the airfoil including an outer wall defining a leading edge of a first radius; an inner wall defining an inner open cavity through the airfoil, the inner wall including a forward portion proximate the leading edge defining a second radius different than the first radius, wherein each of the outer wall and the inner wall are formed with plies of a ceramic matrix composite bonded to one another by a resin; and a first spacing between the outer wall and the inner wall at the leading edge, the first spacing defining an empty space and wherein material disposed within the first spacing, the material disposed within the first spacing is not part of either the outer wall or the inner wall and the outer wall comprises the ceramic matrix composite.

9. The vane assembly as recited in claim 8, wherein the outer platform and the inner platform comprise the ceramic matrix composite integrally formed with the airfoil.

10. The vane assembly as recited in claim 8, wherein the first radius is smaller than the second radius.

11. The vane assembly as recited in claim 8, wherein the outer wall defines a trailing edge and a second spacing is disposed between the outer wall and the inner wall at the trailing edge and the second spacing is filled with the stacked plies of the material.

12. The vane assembly as recited in claim 8, wherein both the inner wall and the outer wall comprise the ceramic matrix composite.

\* \* \* \* \*